United States Patent
Ghosh et al.

[11] Patent Number: 5,884,387
[45] Date of Patent: Mar. 23, 1999

[54] METHOD OF FORMING SELF-LUBRICATING, CERAMIC ELEMENTS FOR A DRIVE SYSTEM OR SIMILAR APPARATUS

[75] Inventors: Syamal K. Ghosh; Dilip K. Chatterjee; John A. Agostinelli, all of Rochester, N.Y.

[73] Assignee: Eastman Kodak Company, Rochester, N.Y.

[21] Appl. No.: 826,629

[22] Filed: Apr. 3, 1997

[51] Int. Cl.$^6$ ........................................... B22F 7/00
[52] U.S. Cl. ................................................ 29/527.1
[58] Field of Search .................................... 29/527.1

[56] References Cited

U.S. PATENT DOCUMENTS

| | | |
|---|---|---|
| 2,940,232 | 6/1960 | Wallace et al. . |
| 3,466,845 | 9/1969 | Beekes et al. . |
| 4,115,913 | 9/1978 | Moriya et al. ............................. 29/450 |
| 4,582,972 | 4/1986 | Curtin et al. .......................... 219/10.69 |
| 4,614,019 | 9/1986 | Shimizu et al. ........................... 29/450 |
| 4,624,812 | 11/1986 | Farrow et al. ............................. 264/63 |
| 4,704,098 | 11/1987 | Tsubakimoto ........................... 474/206 |
| 5,336,282 | 8/1994 | Ghosh et al. ............................. 51/309 |
| 5,358,913 | 10/1994 | Chatterjee et al. ..................... 501/103 |

FOREIGN PATENT DOCUMENTS

| | | |
|---|---|---|
| 3005349 | 8/1981 | Germany . |
| 59218262 | 12/1984 | Japan . |
| 94/13525 | 6/1994 | WIPO . |

*Primary Examiner*—Joseph J. Hail, III
*Assistant Examiner*—William Hong
*Attorney, Agent, or Firm*—Clyde E. Bailey, Sr.

[57] ABSTRACT

A method of forming ceramic elements for a drive system or similar apparatus includes providing highly efficient, light weight, durable, and wear and abrasion resistant sliding components. In particular, the method uses high precision tetragonal zirconia polycrystal (TZP) ceramic or alternatively zirconia-alumina ceramic composite for forming the components of drive system.

8 Claims, 5 Drawing Sheets

Fig. 3
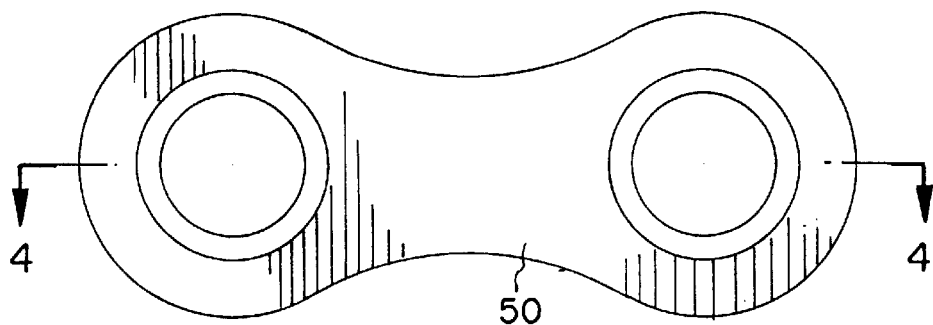
Fig. 4
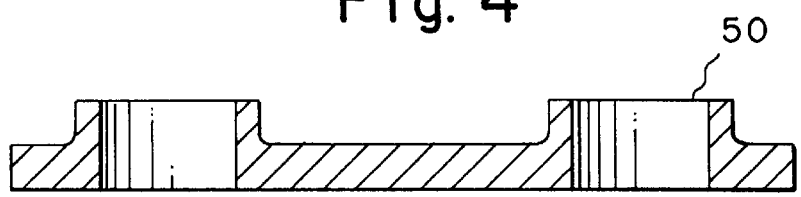
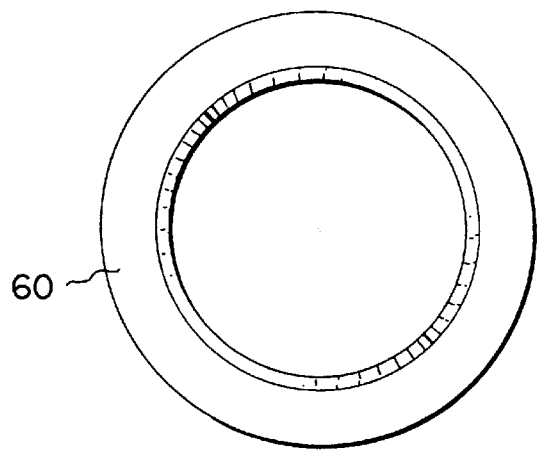
Fig. 5
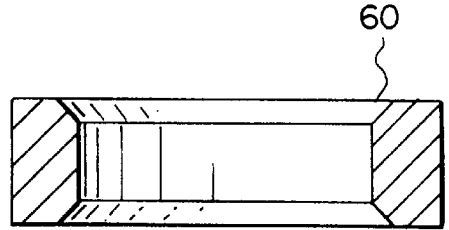
Fig. 6

5,884,387

METHOD OF FORMING SELF-LUBRICATING, CERAMIC ELEMENTS FOR A DRIVE SYSTEM OR SIMILAR APPARATUS

FIELD OF THE INVENTION

The invention relates to a method of forming a drive system having ceramic components. More particularly, the invention concerns a method of forming components of a ceramic drive system that have contacting surfaces having high precision, durable, wear resistant tetragonal zirconia polycrystal (TZP) ceramic and zirconia based composite elements.

BACKGROUND OF THE INVENTION

The use of metal drive chains and sprockets in drive systems to transfer mechanical power from one moving element of a machine to another moving element is very well known. Drive chains are commonly used in machines powered by electric motors or actuators, internal combustion engines, human-power and the like. A shortcoming of conventional metal drive system components, such as chains and sprockets, is that they require periodic lubrication which attracts contamination that ultimately erodes chain performance and useful life.

It is well understood that the lubricant is problematic in many manufacturing processes that are sensitive to contamination. For example, in the manufacture of photographic sensitized goods, contamination of the product by debris and lubricant from chain drive mechanisms is an issue which can affect product yield. Similarly, in the food packaging industry, contamination of the food product or package by chain lubricant or debris is unacceptable. Chain drive systems in bicycles require lubrication to lower friction thereby reducing the work required of the rider and also to reduce chain wear. Unfortunately for off-road bicycle applications, chain lubricants pick up and hold abrasive grit from the environment which itself causes excessive wear and abrasion and shortens chain life. An associated problem is chain ring (sprocket) wear. In high-performance bicycle applications, chain rings require replacement when their tooth height equals the tooth-to-tooth separation along the chain ring.

In some applications, for example, chains for high performance bicycles, chain stretch is a recognized problem, and is an indication of the end of useful chain life. Another problem associated with high-performance bicycle chain relates to unsmooth shifting when changing gear ratios. The problem has its origins in friction at both chain ring and rear sprocket because of side loading.

The problems associated with wear, abrasion, friction, stretch and contamination described above could be reduced or eliminated by the use of certain ceramic chains and sprockets/chain rings drive systems having the characteristics of high surface hardness, high bulk toughness and low coefficient of friction. Such components would exhibit long life because of low wear and low stretch, would not require lubrication and would be smooth in operation and shifting.

The use of ceramics in chains in the prior art has been limited. Bottger et al, WO 9413525 describe a metal crawler chain for tracked vehicles that incorporates ceramic bushes. Only the bushes are of ceramic (optionally) and the chain is in the form of a moving track which communicates with the earth and so does not transfer power from one moving element to another as in the present invention. Curtain and Stephens, U.S. Pat. No. 4,582,972 describe a chain feed mechanism for induction heat furnaces. The chain consists of alternating links of stainless steel and ceramic. Power is applied to the chain at the steel links only. Japanese patent 59218262 of Kumamoto describes a method of producing ceramic chains which consist of simple interlocking loop links. The chain of Kumamoto is unsuitable for use with the chain rings or sprockets which are related to the present invention, nor are the materials of Kumamoto suitable for the present invention. German patent 3005349 due to Lemmer describes the use of plurality of ceramic balls or links in the manufacture of printed circuit boards. The chain is laid down to cover circuit board components so as to hold them in place during wire trimming and soldering. The chain of Lemmer is not suitable for drive chain.

Our experience indicates that ceramic materials may have some unexpected advantages in such drive mechanism components, although the prior art currently does not support this conclusion. This is because most of the conventional high performance ceramics are extremely brittle. An example of a material having good hardness and strength is monolithic cubic spinel, however, this material is also highly brittle and is unusable for structural applications. Thus skilled artisans are more inclined to experiment with alternative metallic components in drive mechanisms. Repeated sliding of two surfaces of metal parts, as in this specific case of surfaces of chain links, separator rings and the sprockets, usually leads to excessive wear and abrasion of those surfaces leading to the loss of materials, contaminating the environment from the debris, and also creating a gap between the different components of the drive mechanism. This gap leads to the loss of power, and in some cases jamming and or breakage of the drive mechanism.

Therefore, a need persists for improved drive chain, and sprockets and method of making same so that the drive mechanism will have superior wear and abrasion resistance while being cost effective and easy to manufacture.

SUMMARY OF THE INVENTION

It is, therefore, an object of the present invention to provide a method of forming high precision ceramic elements for a drive system that is reliable, simple to use and cost effective to manufacture.

It is another object of the invention to provide a method for forming high precision ceramic elements for a drive system in which contacting surfaces have remarkably improved wear and abrasion resistance, and therefore, a longer useful life.

It is a feature of the invention that the drive chain and sprockets and method of making same use yttria doped tetragonal zirconia polycrystal ceramic material (Y—TZP) for manufacturing of either the chain assembly and the ceramic center link or the ceramic center rollers, or alternatively use zirconia based composite material.

Accordingly, for accomplishing these and other objects, features and advantages of the invention, there is provided a method of forming high precision ceramic elements or components, such as center links, center rollers and sprockets, of a drive system. The method includes the step of providing ceramic powder comprising either a solely of zirconia alloy or a composite comprising of first concentration of particulate zirconium oxide alloy and a second concentration of particulate aluminum oxide. The zirconium oxide alloy consists essentially of zirconium oxide and a secondary oxide selected from the group consisting of MgO, CaO, $Y_2O_3$, $Sc_2O_3$, and rare earth oxides. Moreover, wherein zirconium oxide alloy has a concentration of the secondary oxide of, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent, relative to the total of said zirconium oxide alloy, said compacting further comprising forming 'green parts', sintering further comprising dense ceramic parts. The ceramic composites, particularly zirconia-alumina composites are made by mixing above zirconium oxide alloy with 0.1 to 50 weight percent α-alumina. Net-shape manufacturing of ceramic articles by dry pressing, particularly of Y—TZP articles are disclosed in U.S. Pat. No. 5,336,282 which is hereby incorporated herein by reference. Alternatively, the net-shape elements of the drive mechanism are made either by wet bag cold isostatic pressing and green machining and sintering, dry bag cold isostatic pressing or by injection molding. In wet bag cold isostatic pressing a mold is provided for receiving and processing the ceramic powder. The ceramic powder is then compacted in the mold provided to form a ceramic billet. The ceramic billet is then shaped or machined so as to independently form near net-shaped ceramic elements for the components of the ceramic drive mechanism, i.e. the center links for drive chains, center rollers and sprockets. In this embodiment of the invention, after the initial shaping, the near net-shaped green elements of the drive mechanism assemblage are then sintered thereby forming sintered ceramic elements. The sintered ceramic components of the drive system may be further machined or shaped before being assembled to form the ceramic drive system. Injection molding of ceramics, particularly ceramics with very fine particulates (e.g. Y—TZP) and composites with bimodal distribution of particulates (e.g. $ZrO_2$—$Al_2O_3$) is disclosed in U.S. patent application Ser. No. 08/736,849 filed Oct. 28, 1996. In this disclosure, however, only one manufacturing method, i.e. cold isostatic pressing, of the components of drive system will be described in detail. Dry bag cold isostatic pressing method can also be used to form near net-shape green parts.

As will be more completely disclosed, the method of our invention applies to a ceramic drive system, more particularly, drive chain assembly which includes contact surfaces of center links and center rollers and also the drive sprockets which are made of ceramic and ceramic composites and a combination thereof. In one embodiment of the invention, the center links are made of Y—TZP. Alternatively, the center link may comprise of composites of Y—TZP, preferably of $ZrO_2$—$Al_2O_3$ composites or vice versa, while the sliding contact surfaces of the sprockets may be made of either tetragonal zirconium oxide alloy or zirconia-alumina ceramic ($ZrO_2$—$Al_2O_3$) composites or of functionally gradient ceramics based on Y—TZP ceramic or $ZrO_2$—$Al_2O_3$ composites. The desired combination of the ceramic materials for the mating surfaces in manufacturing the above elements or components of drive system are essential to overcome the problems described above.

It is, therefore, an advantage of the invention that the ceramic elements of a drive system are reliable, easy to use, cost effective and efficient to practice. Moreover, the ceramic components of drive system made with the method of the invention imparts low cost to the product, while having characteristically high reliability, a longer life, easier manufacturability, and improved wear and abrasion resistance. Other advantageous features of this invention include lower densities of the ceramic materials used in the components of the drive system and their lower coefficients of friction.

BRIEF DESCRIPTION OF THE DRAWINGS

The above mentioned and other objects, features and advantages of the invention and the manner of attaining them will become more apparent and the invention itself will be better understood by reference to the following description of an embodiment of the invention taken in conjunction with the accompanying drawings, wherein:

FIG. 3 is a top plan view of the center link of the invention;

FIG. 4 is a cross-sectional side view of the center link along 4—4 of FIG. 3;

FIG. 5 is a top plan view of the center roller of the invention;

FIG. 6 is a side elevation view of the center roller of the invention;

DETAILED DESCRIPTION OF THE PREFERRED EMBODIMENTS

Figure 1:
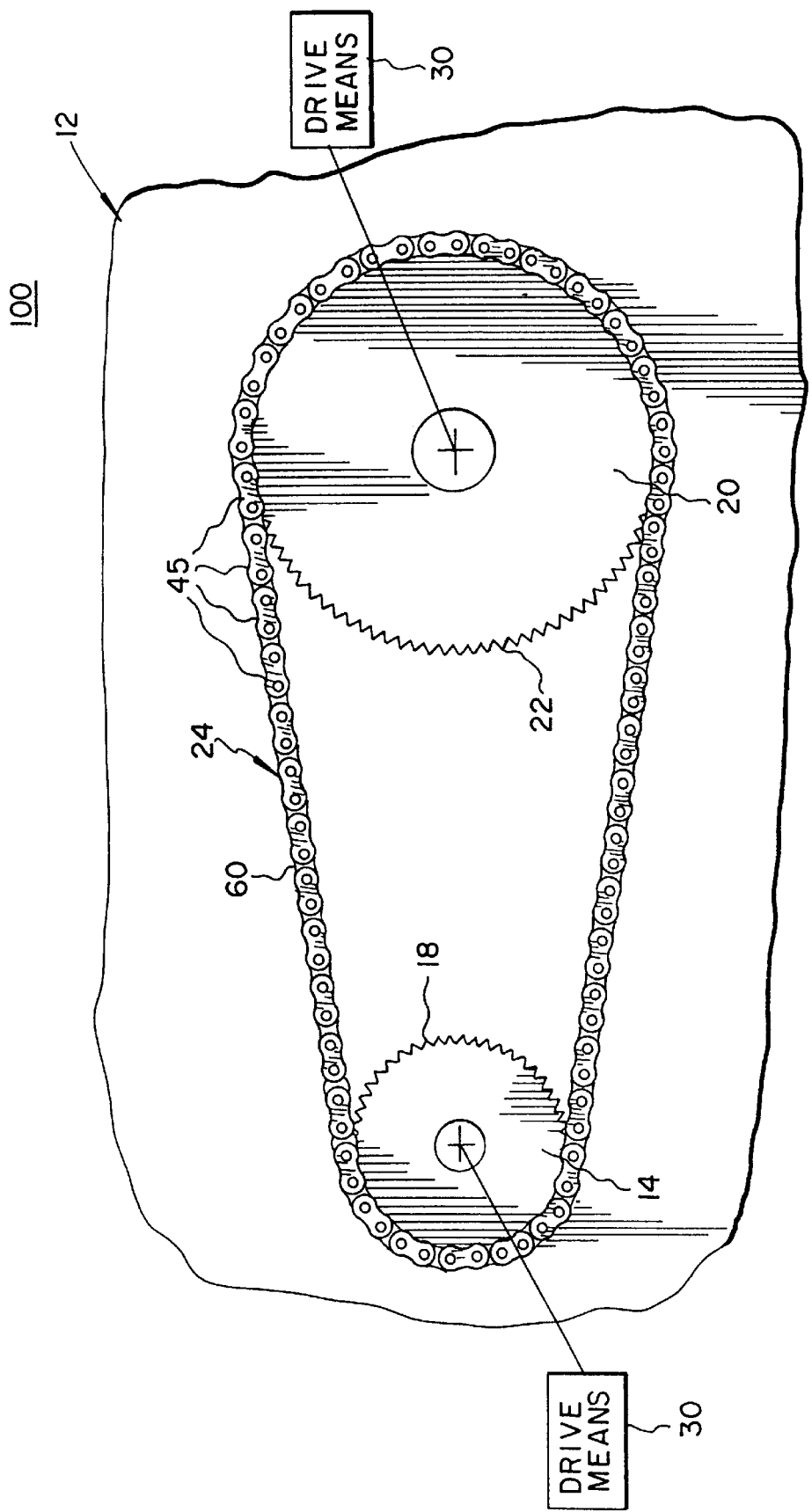
FIG. 1 is a perspective view of the drive system of the invention showing all the individual components, e.g. chain, center roller and sprocket.

To overcome the aforementioned problems in the prior art, we carefully investigated and developed special ceramic materials for use in the drive system 100 of our invention as illustrated in FIG. 1. After considerable development and surprise we found that yttria-doped tetragonal zirconia polycrystal (Y—TZP) ceramic materials offer many advantages over conventional materials, including many other ceramics. Y—TZP is one of the toughest ceramics. It is a high strength material and it also possesses high wear and abrasion resistance. Its density is around 6 gms/cc, which is lower than that of steel (7.8 g/cc). Its coefficient of friction is lower than that of metallic structural materials. Tetragonal zirconia alloy-alumina ($ZrO_2$—$Al_2O_3$) composite, that is, the product of sintering a particulate mixture of zirconia alloy and alumina ceramic, is another tough and high strength structural ceramic composite. This composite also possesses almost all the attractive material characteristics described above.

In FIGS. 1–6, a ceramic drive system 100 according to the principles of the invention is illustrated. Broadly defined, drive system 100 has preferably a rigid frame 12 and a first motion generating means 14 mounted for rotation about the frame 12. Important to the invention, first motion generating means 14 has a first surface 18 comprising zirconia-alumina ceramic composite material. Spaced apart from the first motion generating means 14 is second motion generating means 20 which is similarly mounted for rotation about the frame 12. Second motion generating means 20, moreover, has a second surface 22 comprising zirconia-alumina ceramic composite material. Means 24, cooperatively associated with first and second motion generating means 14, 20, is provided for transferring motion between the first motion generating means 14 and the second motion generating means 20. Importantly, means 24 has a third surface, hereinafter referred to as center roller, 60, comprising tetragonal zirconia ceramic material. Motion is transferred from one of the first and second motion generating means 14, 20 to the other when roller 60 is in moving contact with the first and second surfaces 18, 22 of the first and second motion generating means 14, 20. This moving contact is enabled when one of the first and second motion generating means 14, 20 is rotated by some drive means 30, such as a motor.

Figure 2:
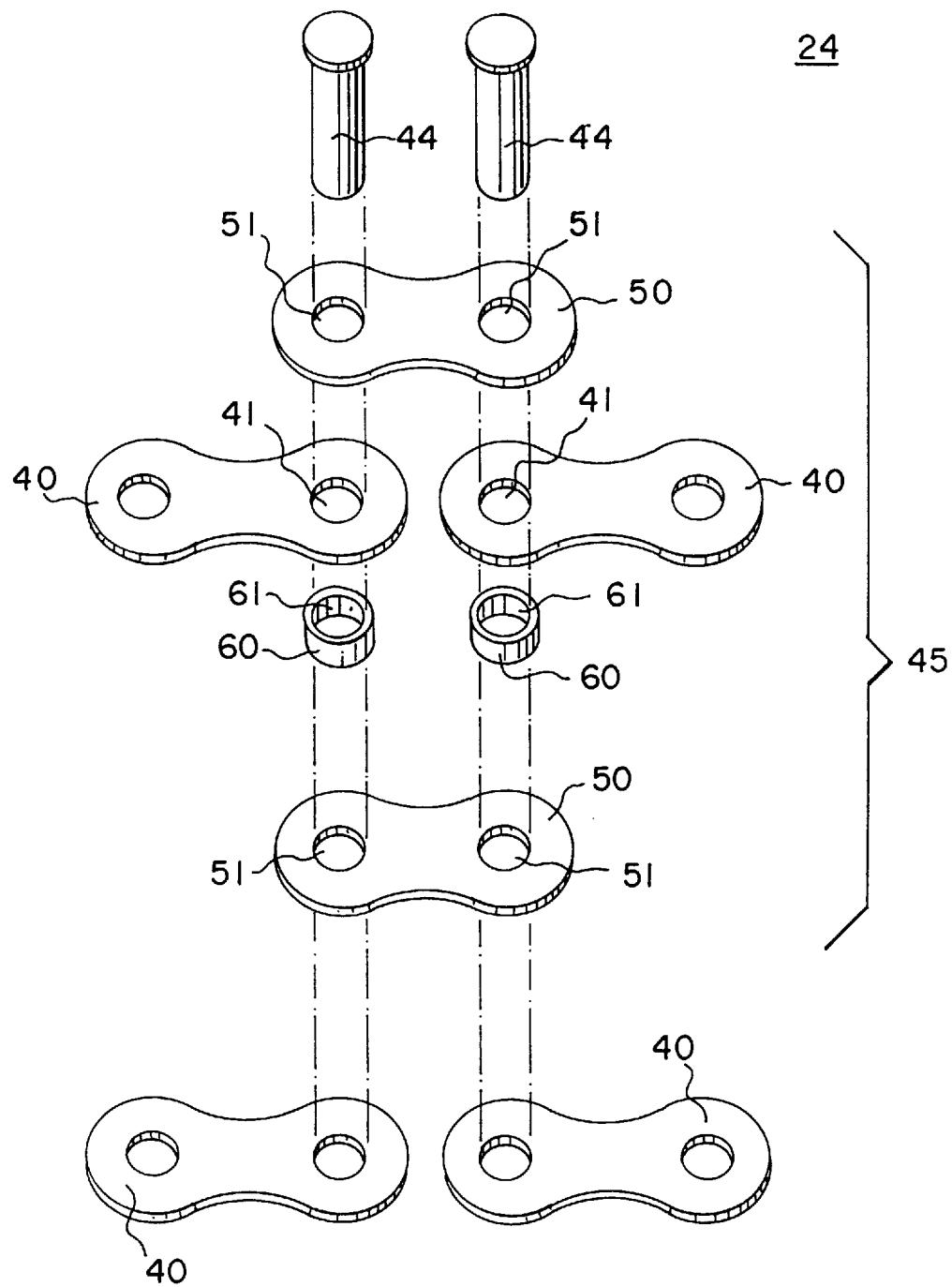
FIG. 2 is an exploded view of the chain assembly of the invention.

According to FIGS. 1 and 2, in a preferred embodiment, drive system 100 includes means, hereinafter referred to as chain, 24, cooperatively associated with first and second sprockets 14, 20 for transferring motion between the first sprocket 14 and the second sprocket 20. Importantly, chain 24 includes a plurality of interconnected main links 45 (exploded view of one main link shown in FIG. 2). Each of the main links 45 comprises a pair of opposing link plates, alternately referred as center links 50. Arranged between the opposing link plates or center links 50 of each of the main links 45 are a pair of connecting links 40 and a pair of center rollers 60, each being connected to form the main link 45 via connecting pins 44 disposed in aligned through openings 51, 41, 61 of link plates 50, connecting links 40, and rollers 60, respectively. As is well known, rollers 60 are exposed between the link plates 50 for contacting the chain 24. Important to our invention, rollers 60 are made of tetragonal zirconia ceramic. Motion is transferred from one of the first and second sprockets 14, 20 to the other when rollers 60 of the chain 24 is in moving contact with the first and second plurality of teeth 18, 22 (described above) of the first and second sprockets 14, 20. This moving contact is enabled when one of the first and second sprockets 14, 20 is rotated by some drive means 30, for instance a motor.

The connecting links 40 comprises a metallic material, such as steel, and the center links 50 comprises tetragonal zirconia ceramic for movably contacting the first and second plurality of teeth 18, 22 of the first and second sprockets 14, 20, respectively.

In another embodiment of the invention, drive system 100 may include a first and second sprocket 18, 20 comprised of tetragonal zirconia ceramic material. Referring to FIG. 2, the chain 24 comprises connecting links 40 and center links 50 supported between opposing connecting links. In this aspect of the invention, connecting link 40, center link 50 and center roller 60 are made of zirconia-alumina ceramic composite which are riveted together by metal connecting pins 44 to form the chain 24 of the invention.

In yet another embodiment of the invention, drive system 100 may include a first and second sprocket 18, 20 comprised of any suitable metal or alloys, such as stainless steel.

Still another embodiment of the invention, drive system 100 may include a first and second sprocket 18, 20 comprised of metal or alloy coated with an active outer contacting surface comprising tetragonal zirconia ceramic material or zirconia-alumina composite ceramic. Skilled artisans will appreciate that various coating methods may be used to coat the active material including plasma spray, chemical vapor deposition (CVD) or physical vapor deposition (PVD). We prefer using plasma spray.

Yet another embodiment of the invention includes a drive system 100 having a first and second sprocket 14, 20 wherein the sprocket comprises an inner, generally round metallic disc and an outer, generally round ring having ceramic teeth formed therein. The outer ring is preferably press fitted or compression fitted onto the inner ring to form the first and second sprockets 14, 20 in accordance with the principles of the invention.

Figure 7:
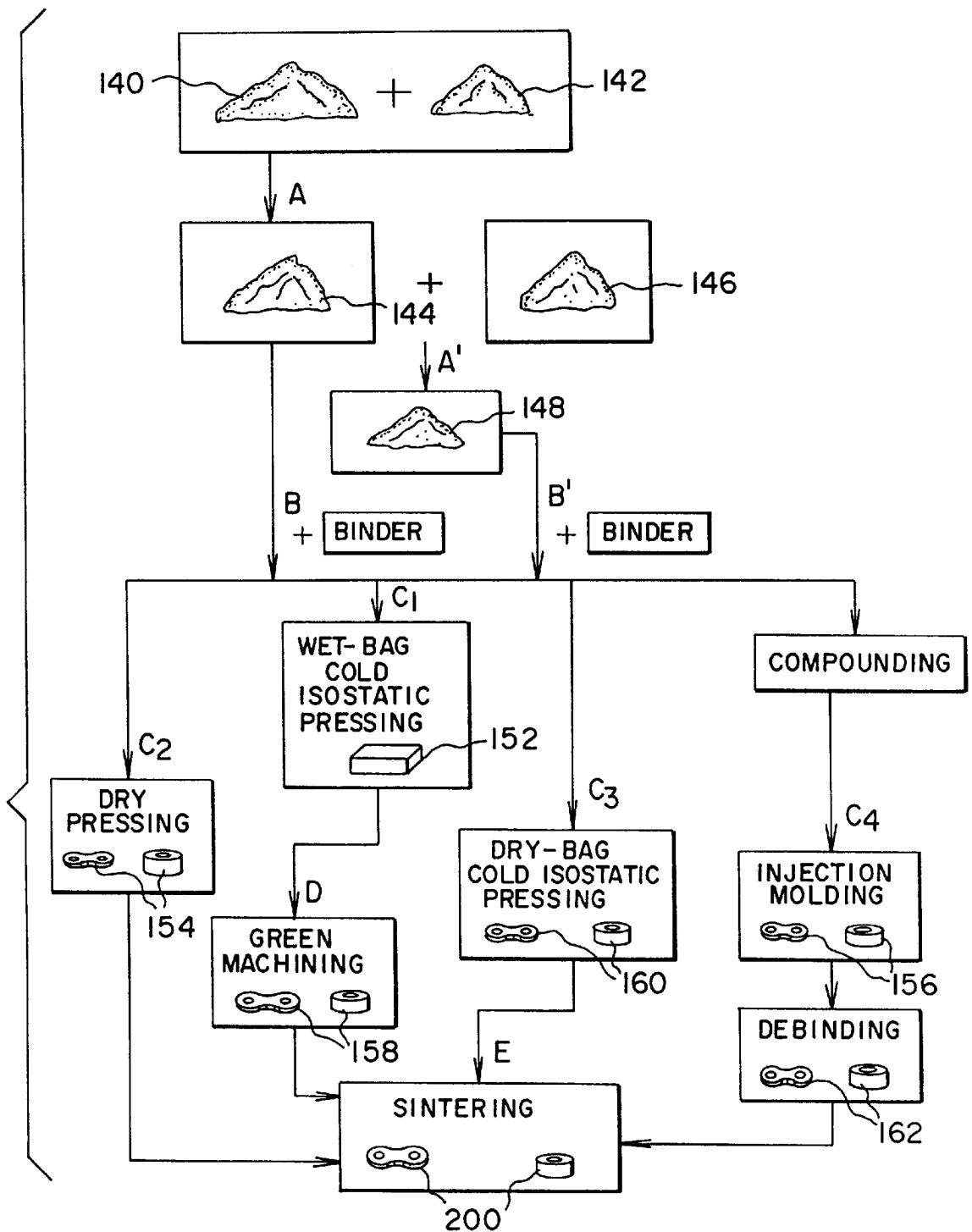
FIG. 7 is a schematic flow diagram of the method of the invention.

Referring to FIG. 7 (Steps A to E), in yet another embodiment of the invention, a method of forming a ceramic drive system is broadly illustrated. As described above, drive system 100 has components including a first and second sprockets 14 and 20 comprising first and second surfaces 18 and 22, respectively; and, a chain drive means 24 comprising a third surface 60 for movably contacting the first and second surfaces of the first and second sprockets. Accordingly, the method comprises the step including providing a ceramic powder comprising particulate zirconium oxide and a secondary oxide selected from the group consisting of MgO, CaO, $Y_2O_3$, $Sc_2O_3$, and rare earth oxides. In our invention, the secondary oxide has a concentration, in the case of $Y_2O_3$, about 0.5 to about 5 mole percent; in the case of MgO, about 0.1 to about 1.0 mole percent In the case of $CeO_2$, the secondary oxide concentration is in the range of about 0.5 to about 15 mole percent. In the case of $Sc_2O_3$, the secondary oxide concentration has a range of about 0.5 to about 7.0 mole percent and in the case of CaO from about 0.5 to about 5 mole percent, relative to the total of the zirconium oxide alloy. Further involved in the method of the invention is the step of providing a mold for receiving and processing the ceramic powder. A compacting step is provided for pressing the ceramic powder in the mold so that a ceramic billet can be formed. After the ceramic billet is formed, it is shaped so as to form independently near net-shaped ceramic components of the drive system, described above. The near net-shaped ceramic components are then sintered thereby forming sintered independent ceramic components for the drive system. The components are further shaped after sintering to form finished ceramic components of the drive system. Thereafter the components can be assembled in the manner described above to form the ceramic drive system that has high precision, durable, wear resistant tetragonal zirconia polycrystal ceramic and zirconia-alumina composite components, as previously described.

Figure 8:
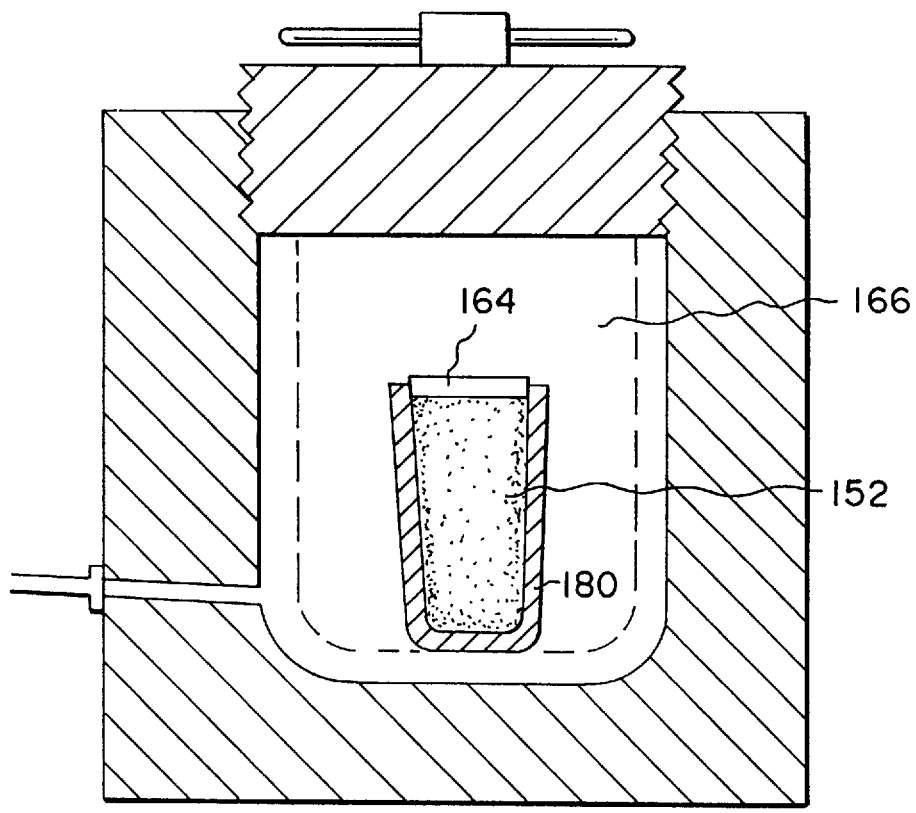
FIG. 8 is a schematic of a wet bag isostatic pressing machine useful in the method of FIG. 7.

It is important to the invention that the ceramic powder used in the method be comprised primarily of zirconium oxide alloy, or a mixture of particulate zirconium oxide alloy and a second concentration of aluminum oxide for forming components of the ceramic drive system 100. Components of the drive system 100 formed in accordance with the method of the invention is illustrated in FIG. 7 and FIG. 8. The zirconium oxide alloy consists essentially of zirconium oxide and a secondary oxide selected from the group consisting of MgO, CaO, $Y_2O_3$, $Sc_2O_3$, and rare earth oxides. Moreover, the zirconium oxide alloy has a concentration of the secondary oxide of, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent, relative to the total of said zirconium oxide alloy, said compacting further comprising forming a blank. A mold is provided for receiving and processing the ceramic powder. The ceramic powder is then compacted (as described below) in the mold provided to form a ceramic billet. The ceramic billet is then shaped or green-machined so as to form independently near net-shaped green drive mechanism assemblage, i.e., center link, center roller and sprocket, respectively. In this embodiment of the invention, after the initial shaping, the green ceramic drive mechanism assemblage components are sintered thereby forming a sintered net-shape ceramic drive mechanism assemblage components, as described more fully below. The ceramic components for the drive mechanism assemblage 100, described above, are then further machine or shaped until finished components are formed. Subsequently, the components are arranged in the drive mechanism assemblage 100 as described above.

The method of forming the drive system components, including the center links, center rollers and sprockets, of the invention, is described with more particularity and even greater details below.

Ceramic Powder Material Mixing

According to FIG. 7, Step A diagrammatically illustrates the alloying process. Zirconia powder 140 is combined with one or more secondary oxide powders 142 to provide zirconia alloy powder 144. The preparation of zirconia alloys is well known to those skilled in the art and zirconia alloys are available commercially. For example, particulate zirconia alloy having 3 mole percent $Y_2O_3$ is marketed by Z-TECH Corporation, Bow, N.H., as "SYP-ULTRA 5.2 Yttria Stabilized Zirconia" (presently, HANWHA Advanced Ceramics, as "HWA-3YB") or by TOSOH Corporation of Japan, as "TZ-3YB".

More particularly, we prefer using tetragonal zirconia ceramic material for manufacturing components of the ceramic drive mechanism assemblage 100 in a cost effective way. The most preferred material is essentially zirconia having 100 percent tetragonal crystal structure. We developed this 100 percent tetragonal zirconia by alloying zirconia with a number of secondary oxides as described in U.S. Pat. Nos. 5,336,282 and 5,358,913, hereby incorporated herein by reference.

The most preferred ceramic composite powder mixture most preferred in the method of making zirconia-alumina ceramic composites of the invention includes a particulate zirconia alloy and a particulate alumina made by mixing $ZrO_2$ and additional "secondary oxide" selected from: MgO, CaO, $Y_2O_3$, $Sc_2O_3$ and $Ce_2O_3$ and other rare earth oxides (also referred to herein as "Mg—Ca—Y—Sc-rare earth oxides") and then with $Al_2O_3$. Zirconia alloys useful in the methods of the invention have a metastable tetragonal crystal structure in the temperature and pressure ranges at which the ceramic article produced will be used. For example, at temperatures up to about 200° C. and pressures up to about 1000 MPa, sintered zirconia alloys, wherein zirconium oxide alloy has a concentration of the secondary oxide of, in the case of $Y_2O_3$, about 0.5 to about 5 mole percent; in the case of MgO, about 0.1 to about 1.0 mole percent, in the case of $Ce_2O_3$, about 0.5 to about 15 mole percent, in the case of $Sc_2O_3$, about 0.5 to about 7.0 mole percent and in the case of CaO from about 0.5 to about 5 mole percent, relative to the total of said zirconium oxide alloy exhibit a tetragonal structure. Preferred oxides for alloying with zirconia are $Y_2O_3$, MgO, CaO, $Ce_2O_3$ and combinations of these oxides. It is preferred that the zirconia powder have high purity, greater than about 99.9 percent. Specific examples of useful zirconia alloys include: tetragonal structure zirconia alloys having from about 2 to about 5 mole percent $Y_2O_3$, or more preferably about 3 mole percent $Y_2O_3$. Examples of tetragonal structure zirconia alloys useful in the methods of the invention are disclosed in U.S. Pat. No. 5,290,332. Such zirconia alloys are described in that patent as being useful to provide a "net-shape" ceramic article: a ceramic article that is dimensionally true after sintering and, therefore, does not necessitate further machining prior to use in its intended working environment.

Referring again to FIG. 7, Step A' diagrammatically illustrates an alternative mixture of particulate zirconia alloy powder 144 and a particulate aluminum oxide 146. This alternative mixture can be achieved by mixing mechanically or chemically, for example, mixing by co-precipitation. The particulate mixture formed is from about 50 to 99.9 percent by weight (weight/total weight of particulate mixture) $ZrO_2$, and preferably is from about 80 to about 99 percent by weight $ZrO_2$, or more preferably is from about 80 to about 95 percent by weight $ZrO_2$ and the balance being $Al_2O_3$. The product of this alternative mixture produces zirconia-alumina ceramic composite 148.

The grain and agglomeration sizes and distributions, moisture contents, and binders (if any) can be varied in both the alumina and the zirconia alloy, in a manner known to those skilled in the art. "Grain" is defined as an individual crystal, which may be within a particle, having a spatial orientation that is distinct from that of adjacent grains. "Agglomerate" is defined as an aggregation of individual particles, each of which may comprise multiple grains. In a particular embodiment of the invention, the grain and agglomeration sizes and distributions, and moisture contents of the alumina and the zirconia alloy are substantially the same and are selected as if the zirconia alloy was not going to be mixed with the alumina, that is in a manner known to the art to be suitable for the preparation of a zirconia alloy article.

An example of convenient particulate characteristics for a particular embodiment of the invention is the following. Purity of $ZrO_2$ is preferably well controlled at 99.9 to 99.99 percent, that is, impurities are no more than about 0.1 to 0.01 percent. The grain size is from about 0.1 micrometers to about 0.6 micrometers. The average grain size is 0.3 micrometers. The distribution of grain sizes is: 5–15 percent less than 0.1 micrometers, 40–60 percent less than 0.3 micrometers, and 85–95 percent less than 0.6 micrometers. The surface area of each individual grain ranges from about 10 to about 15 $m^2$/gram or is preferably 14 $m^2$/gram. Agglomerate size is from about 30 to about 60 micrometers and average agglomerate size is: 40–60 micrometers. Moisture content is about 0.2 to 1.0 percent by volume of blank and is preferably 0.5 percent. The mixture of particulate is compacted in the presence of an organic binder.

Referring once again to FIG. 7, Step B, binders such as gelatin or polyethylene glycol (PEG) or acrylic or polyvinyl ionomer or more preferably polyvinyl alcohol, are added to and mixed with the particulate mixture Y—TZP, 144 or a composite mixture of Y—TZP and alumina 148, both illustrated in Step A and A' respectively. This can be achieved preferably by spray drying or ball milling prior to placement of the mixture in a compacting device.

Further, Step B' also illustrates an alternative mixing process known to those who are proficient in the art as "compounding" in which the particulate mixture or mixtures are mixed with greater than 20 percent by weight of an organic binder such as paraffin at a temperature higher than the glass transition temperature of such binder for subsequent injection molding process, illustrated as Step $C_4$.

Compacting

Turning now to compacting and more particularly to the exemplary compacting process illustrated in FIG. 8, the particulate mixture either 144 or 148 is cold compacted using preferably a wet bag cold isostatic press 150 to provide an unsintered blank 152 in Step $C_1$ (FIG. 7). Unsintered blank 152 is alternatively referred to herein as a "green preform". It should be apparent to skilled artisans that a particular method of compacting the powder is not critical. The terms "cold compaction" and the like refer to compression of the particulate mixture at a temperature below glass transition or decomposition temperature of the organic binder. The green preform can be produced by such methods as cold uniaxial pressing or dry pressing (Step $C_2$ in FIG. 7), wet bag cold isostatic pressing (Step $C_1$ in FIG. 7), dry bag cold isostatic pressing (Step $C_3$ in FIG. 7), injection molding (Step $C_4$ in FIG. 7) or by processes such as cold extrusion and tape casting(not shown). The particulate mixture is preferably subjected to uniform compacting forces in order to provide an unsintered blank which has a uniform density. Alternatively, near net-shape green blank of the compounds 154, 156 and 160 (of drive mechanism assemblage 100) are generated using dry pressing, injection molding, and dry bag cold isostatic pressing processes respectively. Further, shown in FIG. 7, prior to sintering, injection molded green blanks 156 are debinded at a temperature higher than the glass transition temperature of the organic binder yielding "brown" blanks 162. Debinded blanks are referred to herein as "brown" blanks.

The particulate mixture of zirconia alloy and/or zirconia-alumina ceramic composite is compacted; heated to a temperature range at which sintering will occur; sintered, that is, maintained at that temperature range for a period of time; and then cooled. During all or part of sintering, the particulate mixture compact or the "green preform" is in contact with dopant, as discussed below in detail. In FIG. 7, element 152 represents the product of both mixing chemical species and binders and subsequent compaction, indicated by arrows A, A', B & $C_1$, respectively. Compaction and sintering are generally discussed herein as two consecutive operations, as indicated by steps C and E, respectively, in FIG. 7, however, the invention is not limited to a particular sequence of compacting and sintering. For example, compaction and sintering can be simultaneous in a single operation or partial compaction can be followed by sintering and further compaction. The interim product of compacting and sintering operations is referred to herein as a "blank", which is illustrated as element 152 in FIG. 7. Blank 152 is at least partially compacted and is either unsintered or not fully sintered.

In a preferred method of the invention, the powder is cold compacted to provide a "green preform", which has a "green" density that is substantially less than the final sintered density of the ceramic component 200 of drive mechanism assemblage 100. It is preferred that the green density be between about 40 and about 65 percent of the final sintered density, or more preferably be about 60 percent of the final sintered density.

Referring again to FIG. 8, using press 150, the wet bag cold isostatic pressing of the powder was done by filling rubber mold 180 with powder 144 or 148 and keeping the mold 180 sealed by plate 164 in autoclave 166 of cold isostatic press 150. Mold 180 is then pressurized to about 25,000 pounds per square inch. Seal plate 164 may either be a metallic material, such as aluminum or steel or a hard rubber. Thus, in accordance with FIG. 7, Step D, near net-shape components 158 of drive mechanism assemblage 100 are formed by green machining (as discussed below) of the blank 152 using carbide tools. Green machining can be eliminated if dry bag cold isostatic pressing (Step $C_3$ in FIG. 7) for forming is adopted. Then the green components are sintered to full density using preferably sintering schedules described in U.S. Pat. Nos. 5,336,282 and 5,358,913, hereby incorporated hereby by reference. Additionally, if required, final precision machining is done to tight tolerances to produce the components of drive mechanism assemblage of the invention using diamond tools. Near net-shaped green preforms 154 or 156 or 160 produced either by dry pressing or by injection molding or by dry bag cold isostatic pressing, respectively, did not warrant green machining to generate net-shaped components after sintering.

Sintering

Once again referring to FIG. 7, Step E, sintering of the green machined components 158 of drive mechanism assemblage 100 is performed in a temperature range from about 1400° C. to about 1600° C., or more preferably about 1500° C. Preferable sintering time is in the range from about 1 hour to about 3 hours, or more preferably, about 2 hours. In a particular embodiment of the methods of the invention, the sintering peak temperature is 1500° C. and that temperature is maintained for about 2 hours. It is preferred that the pre-sintered components of drive mechanism assemblage 100 be slowly heated to sintering temperature and slowly cooled so as to avoid undesirable dimensional changes, distortions and crack development. In an embodiment of the invention having a preferred sintering temperature of 1500° C., preferred temperature ramps during heating are: about 0.3° C./minute from room temperature to about 300° C., about 0.1° C./minute from about 300° C. to about 400° C., about 0.4° C./minute from about 400° C. to about 600° C., and about 1.5° C./minute from about 600° C. to about 1500° C. Preferred temperature ramps during cooling are: about 2° C./minute from about 1500° C. to about 800° C. and about 1.6° C./minute from about 800° C. to room temperature.

Alternatively, sintering may be achieved in the presence of a dopant selected from: MgO, FeO, ZnO, NiO and MnO, and combination thereof, as discussed below in detail. The resulting zirconia-alumina ceramic composite components of the drive mechanism assemblage of the invention has a core of α-alumina and tetragonal zirconia and a case of cubic spinel or cubic spinel along with cubic structure or cubic and monoclinic or tetragonal structure of zirconia alloy. For zirconia alloy ceramic, sintering in the presence of dopant selected from "Mg—Ca—Y—Sc-rare earth oxides" will produce articles with cores having tough tetragonal crystal structure and the cases having hard cubic crystal structure.

In the sintering process, the dopant oxide selected from MgO, FeO, ZnO, CoO, NiO, and MnO, and combination thereof, is in contact with the blank. It is preferred that the sintering result in a ceramic components having a "full" or nearly theoretical density, and it is more preferred that the density of the ceramic components be from about 99.5 to about 99.9 percent of theoretical density. Sintering is conducted in air or other oxygen containing atmosphere.

The methods of the invention are not limited to any particular sintering pressure and temperature conditions. Sintering can be performed at atmospheric pressure or alternatively at higher pressure, such as that used in hot isostatic pressing can be used during all or part of the sintering to reduce porosity. The sintering is continued for a sufficient time period for the case of the article being sintered to reach a thermodynamic equilibrium structure. An example of a useful range of elevated sintering pressures is from about 69 MPa to about 207 MPa, or more preferably about 100 to 103 MPa.

The exact manner in which the dopant is in contact with the blank during sintering is not critical, however, the "case" as that term is used herein, is limited to those areas of the blank in contact with the dopant during sintering. For example, a cubic spinel and tetragonal zirconia case can be readily produced by the methods of the invention on a portion of the overall surface of an article. It is not critical that the dopant be in contact with the blank during initial sintering, that is, sintering which does not result in an increase in density to full density.

Prior to observing the results of the examples, the inventors had thought that they would be able to provide an explanation for conversion methods having any relative percentages of zirconia alloy and alumina. The inventors had expected results to be in accord with the concepts that the formation of cubic spinel is highly favored thermodynamically over the conversion of tetragonal zirconia to cubic zirconia and that the mechanism of action follows alumina concentration.

What has been discovered by the inventors is that, surprisingly, if the concentration of alumina in the blank 152 is from about 5 weight percent (relative to the total weight of zirconia and alumina) to about 50 weight percent, then the method of the invention produces an article having a case that is cubic spinel and tetragonal zirconia and a core that is a-alumina and tetragonal zirconia. During sintering, dopant, in effect, diffuses past tetragonal zirconia until all of the dopant has contacted and reacted, i.e., "partitioned", with alumina. In contrast, if the concentration of alumina in the blank is less than about 5 weight percent or greater than about 75 weight percent, then the method of the invention produces an article that has a case that is substantially composed of cubic spinel and cubic zirconia or cubic and monoclinic zirconia and a core that is $\alpha$-alumina and tetragonal zirconia. During sintering, dopant does not, in effect, diffuse past tetragonal zirconia until all of the dopant has contacted and reacted with alumina; but rather reacts with alumina and tetragonal zirconia in the same vicinity, leaving alumina deeper within the blank unreacted.

These results are not compatible with a simple mechanism of action based on concentration alone. The results seen are compatible with a mechanism of action based upon an unpredictable alignment of several competing factors, such as rate of diffusion of dopant during sintering.

Shaping/Machining

It is known that ceramic parts can be fabricated to net-shape by the compaction processes such as dry pressing, injection molding, slip casting, and extrusion or dry bag cold isostatic pressing or wet bag cold isostatic pressing accompanied by green machining (FIG. 7, Step D). Green machining refers to the process of machining the ceramic particulate compact prior to densification. (For more general information refer to David W. Richerson, *Modern Ceramic Engineering: Properties, Processes and Use in Design*, $2^{nd}$ Edition (1992)). In this process, it is important that care be exercised to avoid overstressing the fragile material and producing chips, cracks, breakage, or poor surface. For instance, it is important that the ceramic billet is held rigidly, but with no distortion or stress concentration, during green machining. The part can be rigidly held by one of a numerous ways, including by simple mechanical gripping, by bonding or potting with a combination of beeswax and precision metal fixtures, the latter being preferred by the inventors. Once the ceramic billet is secured rigidly in a fixture, green machining can be accomplished in a variety of methods, including: turning, milling, drilling, form wheel grinding, and profile grinding. The inventors prefer turning and profile grinding the billet during green machining to achieve the best results. Machining can be either dry or wet, depending on the binder present and whether or not the part has been bisque fired, i.e., fired at a high enough temperature to form bonds at particle-particle contact points, but not at a high enough temperature to produce densification.

Apart from green machining, an alternative precision machining of some of the surfaces may be required to meet dimensional tolerances and to achieve improved surface finish or remove surface flaws. Maintaining dimensional tolerances to the extent of few millionths of an inch or achieving surface finish to less than 10 microinches is not possible unless final machining after sintering is undertaken. We accomplished dimensional tolerances to the extent of ±100 millionth of an inch using dry pressing (uniaxial pressing) for parts for simple geometry and controlling the shrinkage by our patented sintering process. Precision machining is required when the part demands tolerances in certain dimensions less than 100 millionth of an inch and also to meet some dimensional tolerances such as roundness, perpendicularity, parallelness, etc. As contrasted with green machining, final precision machining of the sintered ceramic bearing requires diamond tooling and also sophisticated machines. Skilled artisans would know that milling, grinding, lapping and polishing are some effective procedures which are used in precision machining.

This invention is further clarified through the following examples:

WORKING EXAMPLE 1

Zirconia ceramic powder (prealloyed with secondary oxides described in U.S. Pat. Nos. 5,336,282 and 5,358,913) were packed and sealed in molds made of rubber/polyurethane of 55 to 70 durometers of Shore hardness A (preferably 65 durometers). These molds were cold isostatically pressed in an autoclave at 15 to 30 kpsi (preferably 25 kilo pounds per square inch) to obtain billets of appropriate sizes in width and length.

WORKING EXAMPLE 2

Same as in working Example 1, except that the zirconia alloy powder is premixed with polyvinyl alcohol binder.

WORKING EXAMPLE 3

Same as in working Example 1, except that the zirconia alloy powder is premixed with acrylic binder.

WORKING EXAMPLE 4

Same as in working Example 1, except that the ceramic material is a composite of particulate zirconia alloy and particulate alumina of varying amounts of from 0.1 to 50 weight percent. The binders used in these working examples are the same as that of in the working examples 2 and 3.

WORKING EXAMPLE 5

Preformed blanks produced by cold isostatically pressing are machined in their green state (i.e., before sintering) to produce near net-shaped articles using carbide tools in lathe and milling machines. The cutting speeds in green machining of zirconia billets were maintained between 2800 and 3400 rpm (preferably at 3,200 rpm).

WORKING EXAMPLE 6

Near net-shaped articles of working example 5 were also produced by dry pressing using a die-punch assembly and a cold compacting machine as described below:

Zirconia ceramic powder of working examples 2, 3, and 4 (prealloyed with secondary oxides described in U.S. Pat. Nos. 5,336,282 and 5,358,913) were packed in dies made of D2 steel for different components of the drive mechanism assemblage and uniaxially pressed in a hydraulic press at a pressure of 103 MPa. The green near net-shaped components of the drive mechanism assemblage were ejected from the mold for further sintering.

WORKING EXAMPLE 7

The green machined near net-shaped components of the drive mechanism assemblage made by cold isostatically pressing or near net-shaped components of drive mechanism assemblage made by cold pressing are sintered following schedule described in U.S. Pat. Nos. 5,336,282 and 5,358,913. After sintering the ceramic components of the drive mechanism assemblage achieved full theoretical density of 6.05 gms/cc for yttria stabilized zirconia.

WORKING EXAMPLE 8 AND COMPARATIVE EXAMPLE

The components of the drive mechanism assemblage were assembled and subsequently retrofitted in a drive train testing machine. The testing of the ceramic components of the drive mechanism assemblage showed dramatic improvement over that of the conventional chain materials. The improvement in performance of the components of the ceramic drive mechanism assemblage from the points of view of longer service lives, lower coefficient of friction, lower weights, higher wear and abrasion resistance, no need for lubrication.

While the invention has been described with particular reference to a preferred embodiment, it will be understood by those skilled in the art the various changes can be made and equivalents may be substituted for elements of the preferred embodiment without departing from the scope of the invention. In addition, many modifications may be made to adapt a particular situation in material to a teaching of the invention without departing from the essential teachings of the present invention.

PARTS LIST

The invention has been described using the following reference numerals to identify the parts and features disclosed:

12 rigid frame
14 first sprocket
18 first teeth
20 second sprocket
22 second teeth
24 chain
30 drive means
40 connecting link
44 metal pin
50 center link
60 center roller
100 Ceramic drive mechanism assemblage
140 zirconium oxide or zirconia powder
142 secondary oxide powders
144 zirconia alloy powder
146 aluminum oxide or alumina powder
148 particulate mixture of Y—TZP and alumina or zirconia-alumina ceramic composite
150 isostatic press
152 unsintered blank, or green billet, made by cold isostatic process
154 unsintered blank, or green preforms, made by dry pressing
156 unsintered blank, or green preforms, made by injection molding
158 unsintered blank, or green preforms, made by green machining
160 unsintered blank, or green preforms, made by dry bag cold isostatic pressing
162 "brown" blank
164 seal plate for rubber mold
166 autoclave
180 rubber mold
200 sintered ceramic component

What is claimed is:

1. Method of forming a ceramic drive system having components including a first and second sprockets comprising first and second surfaces, respectively, a chain drive means comprising a third surface for movably contacting said first and second surfaces of said first and second sprockets, the method comprising the steps of:

a) providing a ceramic powder comprising a first concentration of particulate zirconium oxide and a second concentration of secondary oxide selected from the group consisting of MgO, CaO, $Y_2O_3$, $Sc_2O_3$, and rare earth oxides, wherein said secondary oxide has a concentration, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent, wherein said second concentration of any one of said secondary oxides, or a combination thereof, and the first concentration of said zirconium oxide constitutes said ceramic powder;

b) providing a first mold for said first sprocket and a second mold for said second sprocket for receiving and processing said ceramic powder;

c) compacting the ceramic powder in said mold to form a ceramic billet;

d) shaping said ceramic billet so as to form independently near net-shaped ceramic components of said drive system;

e) sintering said near net-shaped ceramic components thereby forming sintered independent ceramic components;

f) assembling said ceramic components to form said ceramic drive system.

2. The method recited in claim 1, wherein said step of compacting comprises cold isostatically pressing said ceramic powder in said mold.

3. The method recited in claim 1, wherein said ceramic powder comprises from about 0.1–50% wt % $Al_2O_3$ and from about 50 to 99.9 wt % Y—TZP, and wherein said Y—TZP comprises about 5.2 wt % yttria.

4. The method recited in claim 3, wherein said ceramic powder comprises 20 wt % $Al_2O_3$ and 80 wt % Y—TZP, and wherein said Y—TZP comprises about 5.2 wt % yttria.

5. Method of forming a ceramic drive system having components including a first and second sprockets comprising first and second surfaces, respectively, a chain drive means comprising a third surface for movably contacting said first and second surfaces of said first and second sprockets, the method comprising the steps of:

a) providing a ceramic powder comprising a first concentration of particulate zirconium oxide and a second concentration of secondary oxide selected from the group consisting of MgO, CaO, $Y_2O_3$, $Sc_2O_3$, and rare earth oxides, wherein said secondary oxide has a concentration, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent, wherein said second concentration of any one of said secondary oxides, or a combination thereof, and the first concentration of said zirconium oxide constitutes said ceramic powder;

b) providing a first mold for said first sprocket and a second mold for said second sprocket for receiving and processing said ceramic powder;

c) compacting the ceramic powder in said mold to form a near net-shaped ceramic blank;

d) sintering said near net-shaped ceramic blank thereby forming sintered independent ceramic components;

e) assembling said ceramic components to form said ceramic drive system.

6. The method recited in claim 5, wherein said step of compacting comprises dry pressing said ceramic powder in said mold.

7. The method recited in claim 5, wherein said ceramic powder comprises from about 0.1–50% wt % $Al_2O_3$ and from about 50 to 99.9 wt % Y—TZP, and wherein said Y—TZP comprises about 5.2 wt % yttria.

8. The method recited in claim 5, wherein said ceramic powder comprises 20 wt % $Al_2O_3$ and 80 wt % Y—TZP, and wherein said Y—TZP comprises about 5.2 wt % yttria.

* * * * *